(12) United States Patent
Kwag

(10) Patent No.: US 6,925,906 B2
(45) Date of Patent: Aug. 9, 2005

(54) VEHICULAR SHIFT LEVER

(75) Inventor: Byeong-Cheol Kwag, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 185 days.

(21) Appl. No.: 10/329,137

(22) Filed: Dec. 23, 2002

(65) Prior Publication Data

US 2004/0040405 A1 Mar. 4, 2004

(30) Foreign Application Priority Data

Aug. 27, 2002 (KR) .................................. 10-2002-0050802

(51) Int. Cl.[7] .............................. G05G 7/16; G05G 9/12
(52) U.S. Cl. ...................... 74/523; 74/473.29; 403/221; 403/225
(58) Field of Search .............................. 74/473.29, 490, 74/523; 403/220, 221, 225, 226, 228

(56) References Cited

U.S. PATENT DOCUMENTS

| | | | |
|---|---|---|---|
| 4,492,129 A | | 1/1985 | Hasegawa ................. 74/473 R |
| 4,492,130 A | * | 1/1985 | Lamy et al. ............. 74/473.29 |
| 4,524,633 A | * | 6/1985 | Murata et al. ........... 74/473.36 |
| 4,569,246 A | | 2/1986 | Katayama et al. ........ 74/473 R |
| 4,603,598 A | * | 8/1986 | Tsuji et al. .............. 74/473.34 |
| 4,960,009 A | * | 10/1990 | Schultz et al. ........... 74/473.29 |
| 5,213,002 A | | 5/1993 | Langhof et al. .......... 74/473 R |
| 5,452,623 A | | 9/1995 | Knight ..................... 74/473 R |
| 5,579,661 A | | 12/1996 | Yarnell et al. ............ 74/473 R |
| 6,240,802 B1 | | 6/2001 | Miller ......................... 74/523 |
| 6,363,813 B1 | | 4/2002 | Vian ......................... 74/551.9 |
| 6,783,297 B2 | * | 8/2004 | Hashimoto et al. ......... 403/225 |
| 2002/0124675 A1 | | 9/2002 | Hashimoto et al. |

FOREIGN PATENT DOCUMENTS

| | | | | |
|---|---|---|---|---|
| JP | 01199220 A | * | 8/1989 | ............ G05G/9/12 |
| JP | 2000291789 A | * | 10/2000 | ........... F16H/59/04 |
| WO | WO 97/44723 | | 5/1997 | |

* cited by examiner

*Primary Examiner*—Chong H. Kim
(74) *Attorney, Agent, or Firm*—Morgan Lewis & Bockius LLP

(57) ABSTRACT

The vehicular shift lever has rubber bushes tightly fastened to the external surface of a lever axle and a cover pressed over the external side of the rubber bush. The shift lever includes: first and second rubber bushes fastened to the top and bottom of the lever axle with a preset interval therebetween; a plurality of protruders formed radially at the external circumferential surface of one or more rubber bushes; and a third rubber bush installed at the external side of the protruder with the internal and external sides thereof being attached to the external surface of the protruder and the internal surface of the cover, respectively. This reduces the amount of material required for the rubber bushes, and effectively absorbes vibration and decreases noise.

6 Claims, 3 Drawing Sheets

VEHICULAR SHIFT LEVER

FIELD OF THE INVENTION

The present invention relates to a vehicular shift lever, and more particularly, to a vehicular shift lever having a double insulation structure for minimizing vibration conveyed to a handle from a lever axle and for reducing noise.

BACKGROUND OF THE INVENTION

In general, a vehicular shift lever is installed beside a driver's seat for shifting gears in a transmission based on the desired speed of a vehicle. However, conventional vehicular shift levers do not completely absorb the vibration conveyed from the engine and transmission, thereby causing a loud vibrational noise at the handle of the vehicular shift lever.

SUMMARY OF THE INVENTION

The present invention provides a vehicular shift lever that reduces the amount of material required for the rubber bushes. The present invention also improves the gear-shifting feel or motion by reducing vibration and noise of the shift lever.

In accordance with an embodiment of the present invention, there is provided a vehicular shift lever having rubber bushes tightly fastened at the external surface of a lever axle and a cover pressed over the external side of the rubber bush. The shift lever includes: first and second rubber bushes fastened at the top and bottom of the lever axle with a preset interval therebetween; a plurality of protruders formed radially at the external circumferential surface of one or more rubber bushes; and a third rubber bush installed at the external side of the protruder with the internal and external sides thereof being attached to the external surface of the protruder and the internal surface of the cover, respectively.

It is preferable that a steel member is fastened at a space between the protruders to increase the strength of the rubber bushes and to absorb the various modes of vibration. The steel member is tightly attached at the internal surface of the third rubber bush and a preset size of an interval is formed between the first and second rubber bushes.

According to the invention there is provided a vehicular shift lever having a shift lever, a first bush, a second bush, and a cover. The first bush is fastened around a circumference of the shift lever, and includes a plurality of protruders extending radially away from the shift lever. The second bush is installed around the protruders and make contact with the protruders. The cover is fastened around the second bush. A third bush is fastened around a circumference of the shift lever at a predetermined distance from the first bush. The cover is fastened around the third bush. Also, the first, second, and third bushes are preferably made from rubber. A steel member is also preferably fastened at a space between the protruders to increase strength of the first and second bushes and to absorb vibration. The steel member is fastened to an internal circuference of the second rubber bush.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
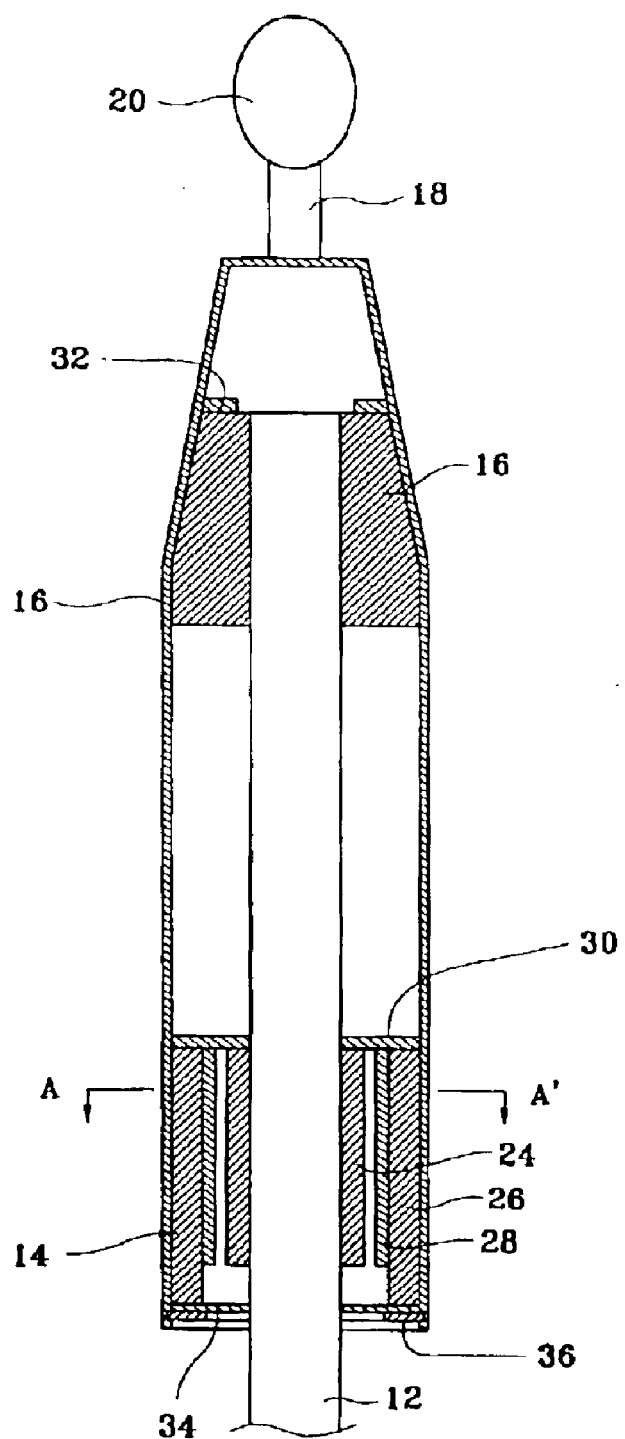
FIG. 1 is a structural, cross-sectional view illustrating a vehicular shift lever in accordance with the present invention.
Figure 2:
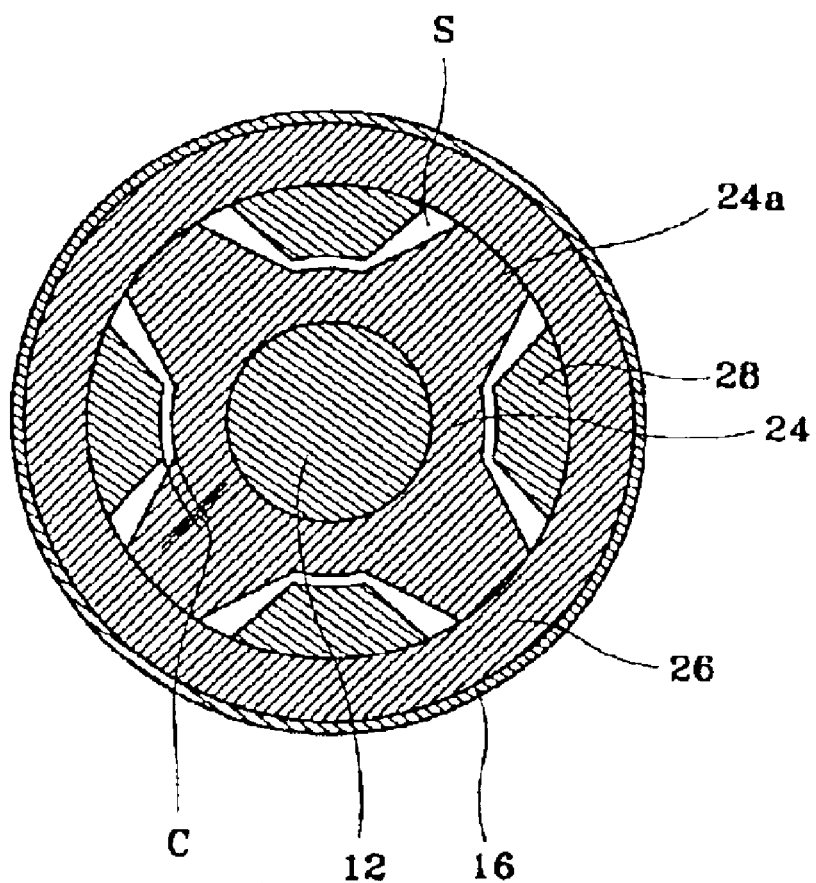
FIG. 2 is a cross-sectional view illustrating a vehicular shift lever cut along arrow line A—A in FIG. 1.

As shown in FIGS. 1 and 2, a rubber bush is fastened at the external surface of the lever axle 12 to form a rubber bush assembly body 14. A cover is wrapped at the external side of the rubber bush assembly body 14. A protruded rod 18 is formed at the top of a cover 16, and a handle 20 is mounted at the end of the protruded rod 18.

Figure 3:
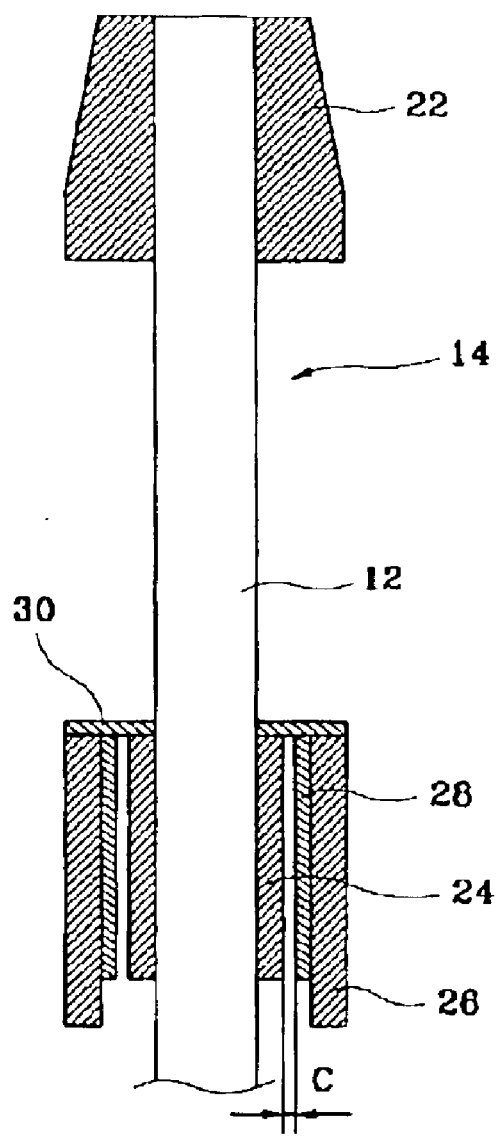
FIG. 3 is a structural view illustrating a rubber bush assembly body in FIG. 1.

As shown in FIGS. 2 and 3, the rubber bush assembly body 14 includes a first rubber bush 22 having a top, an external surface to fit the top, an internal surface shape of the cover 16, a second rubber bush 24 inserted and fastened with a plurality of protruders 24a formed radially at the bottom, an external circumference of the lever axle 12, and a third rubber bush 26. The third rubber bush 26 is formed at the external side of the protruders 24a with its internal and external surface being tightly attached to the external surface of the protruder and the internal surface of the cover. Furthermore, a steel member 28 is fastened at space S between the protruders 24a to increase the strength of the rubber bushes and the various modes of vibration.

The top ends of the second and third rubber bushes 24, 26 and that of the steel member 28 are aligned and fixed at a fastening plate 30 for integration with the lever axle 12. The fastening plate 30 is preferably made of rubber and is fitted onto the external surface of the lever axle 12, thereby forming a shape of a vulcanized and adhered washer.

The second rubber bush 24 with its protruders 24a is inserted around the lever axle 12. The steel member 28 is vulcanized and adhered to the internal surface of the third rubber bush 26. Also, a crevice C having a preset size is formed between the steel member 28 and the second rubber bush 24. The lower part of the lever axle 12 and the structure of the third rubber bush are peferably coupled to of the second rubber bush, can be identically constructed to the side of the first rubber bush. The top, external surface of the cover 16 is tapered, and a stopper 32 is protruded at the internal surface of the tapered part for hitching the first rubber bush 22 of the rubber bush assembly body 14.

The rubber bush assembly body 14 is pressed and inserted into the internal side of the cover 16 after an adhesive is applied to the external surfaces of the first and third rubber bushes 22, 26. At this time, in order to prevent the rubber bush assembly body 14 from sliding out after its insertion, a washer 34 and a snap ring 36 are subsequently inserted into the bottom, internal side of the cover 16 for firmly fastening to the bottom: surface of the third rubber bush 26. A groove is formed at the bottom, internal surface of the cover 16 along its circumference for insertion of the snap ring 36.

Accordingly, at the top of the lever axle, the vibration of the engine and transmission is conveyed through the first rubber bush 22 to the cover 16. Meanwhile, at the bottom of the lever axle, the vibration of the engine and transmission is conveyed through the protruders 24a of the second rubber bush 24 to the third rubber bush 26. As a result, the protruders 24a significantly absorb the vibration of the engine and transmission.

Alternatively, the crevice between the protruders 24a of the second rubber bush 24 and the steel member 28 is reduced, so that the vibration of the engine and transmission is conveyed through the steel member 28 to the third rubber bush 26 and to the cover 16. This effectively absorbes the various modes of vibration and simultaneously decreases noise.

As described above, an advantage of the vehicular shift lever of the present invention is that the rubber bushes are installed at both sides of the lever axle whose middle part is left hollow. This reduces the amount of the rubber bush material required and effectively absorbes vibration and decreases noise.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A vehicular shift lever having rubber bushes tightly fastened to the external surface of a lever axle and a cover pressed over the external side of the rubber bushes, the shift lever comprising:

first and second rubber bushes fastened to the top and bottom of said lever axle with a preset interval therebetween;

a plurality of protruders formed radially at the external circumferential surface of one or more rubber bushes; and a third rubber bush installed at an external side of said protruders with internal and external sides thereof being attached to an external surface of said protruders and an internal surface of said cover, respectively.

2. The shift lever as defined in claim 1, wherein a steel member is fastened at a space between said protruders to increase a strength of the rubber bushes and to absorb various modes of vibration.

3. The shift lever as defined in claim 2, wherein said steel member is tightly attached to the internal surface of said third rubber bush, and an interval having a preset size is formed between said first and second rubber bushes.

4. A vehicular shift lever, comprising:

a shift lever;

a first bush fastened around a circumference of said shift lever, where said first bush includes a plurality of protruders extending radially away from said shift lever; and a second bush installed around said protruders, where said protruders contact said second bush; and a cover fastened around said second bush, further comprising a third bush fastened around a circumference of said shift lever at a predetermined distance from said first bush, where said cover is fastened around said third bush, and wherein said first, second, and third bushes are made from rubber.

5. The vehicular shift lever of claim 4, wherein a steel member is fastened at a space between said protruders to increase strength of said first and second bushes and to absorb vibration.

6. The vehicular shift lever of claim 5, wherein said steel member is fastened to an internal circumference of said second rubber bush.

* * * * *